United States Patent
Barrick et al.

(10) Patent No.: US 7,302,530 B2
(45) Date of Patent: Nov. 27, 2007

(54) METHOD OF UPDATING CACHE STATE INFORMATION WHERE STORES ONLY READ THE CACHE STATE INFORMATION UPON ENTERING THE QUEUE

(75) Inventors: Brian David Barrick, Pflugerville, TX (US); Dwain Alan Hicks, Pflugerville, TX (US); Takeki Osanai, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 10/897,348

(22) Filed: Jul. 22, 2004

(65) Prior Publication Data

US 2006/0020759 A1 Jan. 26, 2006

(51) Int. Cl.
*G06F 12/08* (2006.01)
(52) U.S. Cl. .................................................. 711/144
(58) Field of Classification Search ........... 711/140, 711/144
See application file for complete search history.

(56) References Cited

U.S. PATENT DOCUMENTS

| | | | | |
|---|---|---|---|---|
| 5,717,896 | A * | 2/1998 | Yung et al. | 712/205 |
| 5,913,054 | A * | 6/1999 | Mallick et al. | 712/220 |
| 2002/0188817 | A1* | 12/2002 | Norden et al. | 711/169 |
| 2003/0225980 | A1* | 12/2003 | Henry et al. | 711/144 |
| 2005/0138295 | A1* | 6/2005 | Hammarlund et al. | 711/137 |

* cited by examiner

*Primary Examiner*—Kevin L. Ellis
(74) *Attorney, Agent, or Firm*—Carr LLP; D'Ann N. Rifai

(57) ABSTRACT

The present invention provides a method of updating the cache state information for store transactions in an system in which store transactions only read the cache state information upon entering the unit pipe or store portion of the store/load queue. In this invention, store transactions in the unit pipe and queue are checked whenever a cache line is modified, and their cache state information updated as necessary. When the modification is an invalidate, the check tests that the two share the same physical addressable location. When the modification is a validate, the check tests that the two involve the same data cache line.

26 Claims, 3 Drawing Sheets

RPN = REAL PAGE NUMBER
CACHE ADDR = ADDRESSABLE LOCATION WITHIN THE CACHE DATA ARRAY
OFFSET = WHERE ADDRESSED DATA IS WITHIN THE CACHE LINE

METHOD OF UPDATING CACHE STATE INFORMATION WHERE STORES ONLY READ THE CACHE STATE INFORMATION UPON ENTERING THE QUEUE

TECHNICAL FIELD

The present invention relates generally to memory management and, more particularly, to a method of handling reload-hit-store in a high frequency system where stores only read the cache state information upon entering the queue.

BACKGROUND

The state of a cache may change between the placing of an operation storing data from the cache into the unit pipe or into the store portion of the store and load queue and the completion of the store operation. Store operations are queued to allow the program code to move forward. Because of the nature of store ordering requirements on cache coherency, older operations may modify the validity or location of the cache line within the data cache. These modifications may cause the cache state information which the store operations received upon issue to become old or outdated. Maintaining data integrity requires some mechanism to allow the cache state information for the store operations to be updated.

One way to update transactions is to read the cache state information. It may, however, be desirable to limit access to the cache. For example, a cache may be designed with a single read/write access point, or port. The design may afford simplicity, or be suitable for a smaller or low-power cache. With such a design, to read the cache state information, it is necessary to recycle operations through the unit pipe. Repeated recycling to update the store transaction requires many cycles and blocks other accesses to the cache.

Therefore, there is a need for a method of updating the cache state information for store transactions without reading the cache state information in a manner that addresses at least some of the issues associated with conventional updating of store transactions.

SUMMARY OF THE INVENTION

The present invention provides a method of updating the cache state information for store transactions in an system in which store transactions only read the cache state information upon entering the unit pipe or store portion of the store and load queue. Store transactions in the unit pipe and queue are checked whenever a cache line is modified, and their cache state information updated as necessary.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
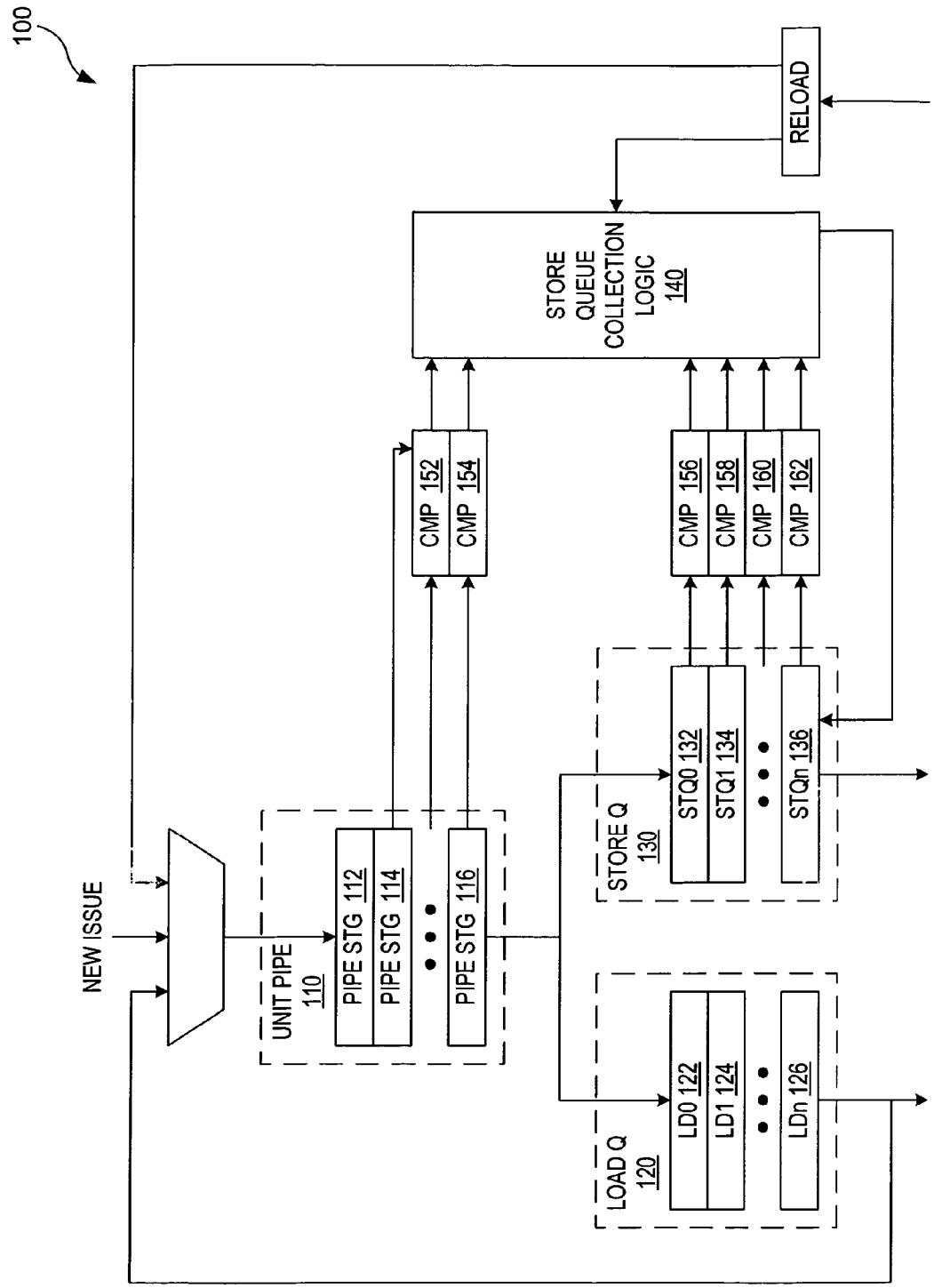
FIG. 1 shows a block diagram of a unit pipe and load and store queue configured to update cache state information for the store transactions without using a cache access cycle.

FIG. 1 shows a block diagram of a unit pipe and load and store queue configured to update cache state information for the store transactions without using a cache access cycle. Transactions enter the unit pipe 110 and proceed in stages, pipe stage 112, pipe stage 114, and pipe stage 116. The ellipsis indicates the possible presence of other stages. The transactions entering the unit pipe 110 can be any type of operation, including but not limited to load, store, and snoop.

From the unit pipe 110, transactions can pass to the load queue 120 or the store queue 130. A number of load transactions have passed to the load queue 120, load transactions 122, 124, and 126. The ellipsis indicates the possible presence of other transactions. A number of store transactions have passed to the store queue 130, store transactions 132, 134, and 136. The ellipsis indicates the possible presence of other transactions.

When the cache is modified, the store transactions are examined to determine if they are affected by the modification to the cache. The address for the cache line being modified is compared to the address for the cache line of the storage transaction. In FIG. 1, the store transactions are the store transactions located in the unit pipe 110 and the store transactions located in the store queue 130, store transactions 132, 134 and 136. The address comparisons are performed on the store transaction in the unit pipe 110 in comparisons 152 and 154 and on the transactions in the store queue 130 in comparisons 156, 158, 160 and 162. Load transactions 122, 124, and 126 are not store transactions, and the address comparison is not performed on them.

Depending upon the result of the comparisons, and the nature of the modification to the cache, the store queue collision logic 140 updates the cache state information for those store transactions affected by the modification to the data cache.

Figure 2:
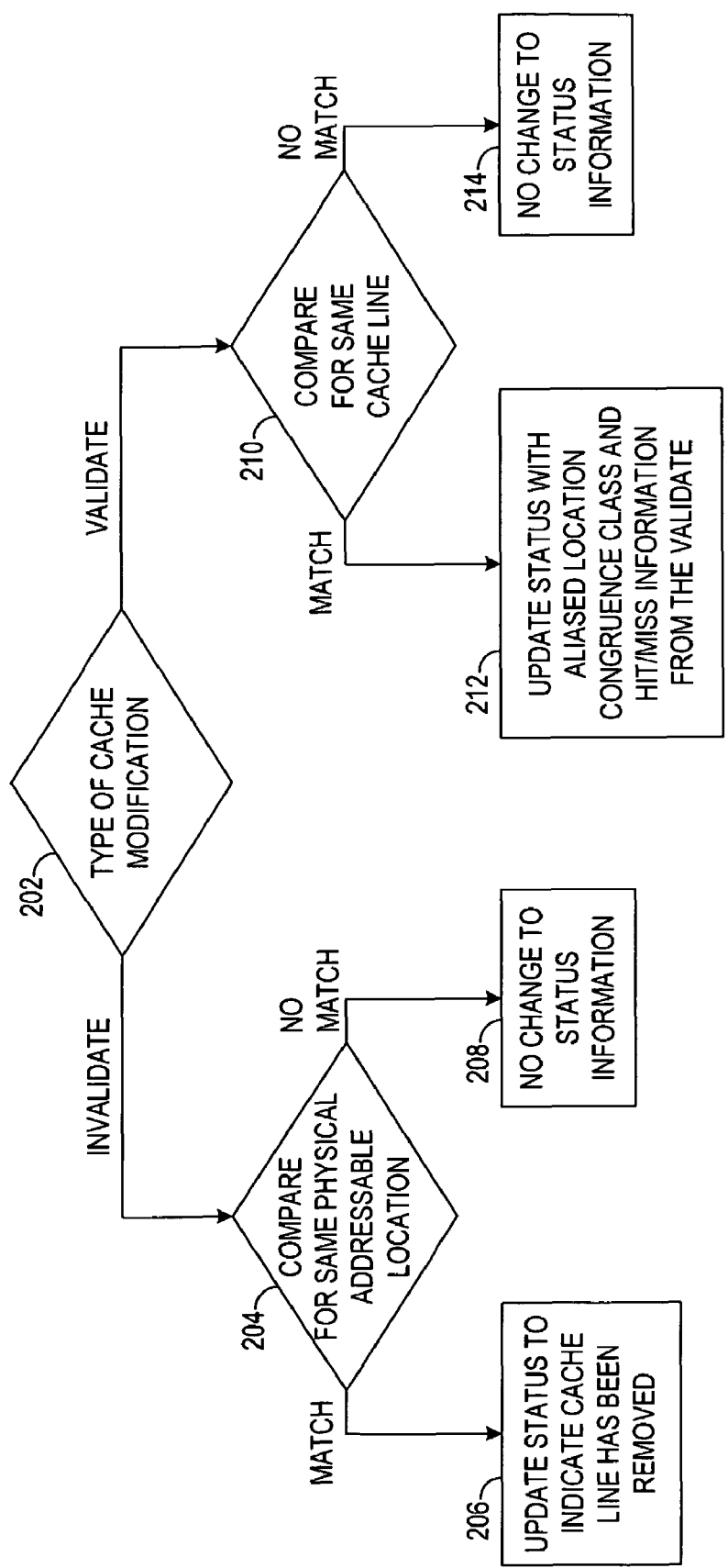
FIG. 2 shows a flow diagram illustrating the updating of cache state information for store transactions after a modification of the data cache.

FIG. 2 shows a flow diagram illustrating the updating of cache status information for store transactions after a modification of the data cache. In step 202, the type of the modification to the cache is checked. When a cache line is invalidated, in step 204 the store queue collision logic 140 checks the store transactions to see if they used data from the same physical addressable location in the data cache as the invalidated cache line. If the comparison is a match, in step 206 the cache status information of the store is updated to indicate that its line has been removed from the cache. If the comparison does not produce a match, in step 208 there is no change to the cache status information for the store transaction.

When a cache line is validated, in step 210 the store queue collision logic 140 checks the store transaction to see if the store involves data from the same cache line. If so, in step 212, the store transaction will be updated with the information about the validated cache line. In an embodiment with set-association and aliasing, the updated information includes the aliased location, congruence class and hit/miss information. In an embodiment of the invention which does not support aliasing, the aliased location information is not maintained and not updated. In an embodiment of the invention which does not have a set-associative cache, the congruence class information is not maintained and updated. If the store is not to the same cache line as the validated cache line, then in step 214 there is no change to the status information.

Figure 3A:
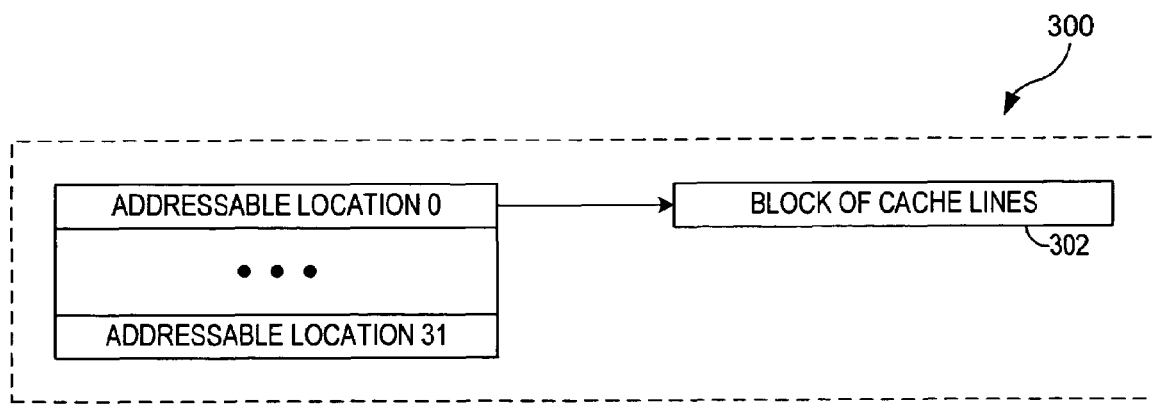
FIG. 3A shows a block diagram of the organization of a data cache.

The nature of the comparison in steps 204 and 210 depend upon the method of organization of the cache and the method of assignment of data blocks to locations within the cache. FIG. 3A shows a block diagram of the organization of a cache. The cache 300 contains 32 addressable locations. Shown are addressable location 0 and addressable location 31. Each addressable location contains a block of eight cache lines. Addressable location 0 contains the block of eight cache lines 302. An aliasing feature narrows the block down to four cache lines. These remaining four lines are set-associative. The location of a cache line in the cache 300 can be specified by specifying the addressable location and the location within the block. Other embodiments of a cache do not support aliasing or set associativity.

Figure 3B:
FIG. 3B shows a block diagram of the segments of a cacheable memory address.

FIG. 3B shows a block diagram of the segments of a cacheable memory address. The defined address ranges from bit 22 to 63. Bits 22:51 indicate the real page number. Bits 52:56 are used to address one of the 32 addressable locations of the cache. Bits 57:63 are the offset, the location of addressed data within the cache line. Whenever a store gets issued, a cache lookup is performed to determine whether the cache line is in the data cache or not. In an embodiment, the lookup returns an 8-bit vector to the store queue collection logic 140 identifying the location of the cache line within the block of eight cache lines contained at an addressable location. The 8-bit vector identifies a set and an aliased location.

Returning to the address comparison in Step 204, in an embodiment with the cache organized as in FIG. 3A and the correspondence between the real address and the cache location as in FIG. 3B, the comparison proceeds in stages. First, bits 52:56 of the real address of the cache line being invalidated are compared with bits 52:56 of the real address of the data contained within the store transaction to check that addressable locations in the data cache match. If so, the 8-bit vector kept by the store queue collection logic 140 is used to determine if the cache line being invalidated is at the same location within the block of eight at the addressable location as the cache line for the data. If the location within the eight cache lines also matches, then the store queue collection logic updates the 8-bit vector for the store transaction to indicate that the line is no longer valid. If either comparison is not a match, then the cache state information of the store transaction is not changed.

In other embodiments, the address comparison in Step 204 operates differently. For example, in a direct-mapped cache, the address comparison can simply be of the bits in the real address that determines the location of the cache line in the data cache. There is no need to store additional information about the location of the cache line within the data cache.

The comparison in step 210 is performed when a new cache line is allocated to the data cache. In this comparison, the full cache line of the new allocate is compared to the full cache line of the store operation. Bits 22:51 and bits 52:56 of each are compared. If there is a match, the store and the new allocate are actually the same cache line. The store transaction is updated by updating its 8-bit vector to describe the location to which the new cache line will be allocated. In other embodiments, the comparison may involve a different bit range.

This method of updating the cache status information of the store transactions updates the information without using a cache access cycle. Instead, information about changes in the cache flows through the unit pipe and the store portion of the store and load queue, and the store transactions there are updated. This method of updating thereby avoids a potential bottleneck in some designs. In a design with a single read/write access point, or port, this method avoids recycling operations through the unit pipe, the only way to read the cache state information. Repeated recycling to update the store transaction requires many cycles and blocks other accesses to the cache.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A system, comprising:
   a cache comprising a plurality of cache lines, wherein each cache line comprises a plurality of locations for storing data;
   a unit pipe coupled to the cache;
   a store and load queue connected to the unit pipe;
   wherein store transactions pass through the unit pipe to the store and load queue;
   wherein each store transaction comprises address information and stores data at an address specified by the address information;
   wherein each store transaction is accompanied by cache state information that specifies a location in one of the cache lines where data at the address specified by the address information is stored; and
   wherein the system is configured to transmit updated cache state information through the unit pipe and the store and load queue when a cache line is modified.

2. The system of claim 1, wherein the cache comprises a single read/write access point.

3. The system of claim 1, wherein the store and load queue further comprises a store queue and a load queue.

4. The system of claim 1, further configured to check and update only the store transactions in the unit pipe and the store and load queue.

5. A method for handling store transactions, comprising:
   accompanying each store transaction with cache state information that specifies one of a plurality of locations in a cache line of a cache where data at an address specified by address information of the store transaction is stored;

transmitting updated cache state information when a cache line of the cache is modified; and updating the cache state information of at least one of the store transactions.

6. The method of claim 5, wherein the updating of the cache state information of the at least one store transaction occurs in a unit pipe or in a store queue.

7. The method of claim 5, further comprising the steps of:
checking the store transactions to determine whether their cache state information needs to be modified.

8. The method of claim 7, wherein in case of an invalidate in the cache the checking of the store transactions comprises testing whether the cache line specified by the cache state information of each store transaction shares the same physical addressable location as the cache line being modified.

9. The method of claim 8, wherein the cache state information comprises congruence class information.

10. The method of claim 8, wherein the cache state information comprises aliased location information.

11. The method of claim 8, wherein in case of an invalidate in the cache the updating the cache state information of the at least one store transaction comprises indicating that the cache line specified by the cache state information of the at least one store transaction has been removed from the cache.

12. The method of claim 7, wherein in case of a validate in the cache the checking of the store transactions comprises testing whether the cache line specified by the cache state information of each store transaction is the cache line being validated.

13. The method of claim 12, wherein the updating of the cache state information comprises updating aliased location information.

14. The method of claim 12, wherein the updating of the cache state information comprises updating congruence class information.

15. The method of claim 12, wherein the updating of the cache state information comprises updating hit/miss information.

16. A computer program product for handling store transactions, the computer program product having a medium with a computer program embodied thereon, the computer program comprising:

Computer code for accompanying each store transaction with cache state information that specifies one of a plurality of locations in a cache line of a cache where data at an address specified by address information of the store transaction is stored;

computer code for transmitting updated cache state information when a cache line of the cache is modified; and computer code for updating the cache state information of at least one of the store transactions.

17. The computer program product of claim 16, wherein the computer code for updating the cache state information comprises computer code for updating the cache state information of the at least one store transaction in a unit pipe or in a store queue.

18. The computer program product of claim 16, further comprising:
computer code for checking the store transactions to determine whether their cache state information needs to be modified.

19. The computer program product of claim 18, wherein in case of an invalidate in the cache the computer code for checking the store transactions comprises computer code for testing whether the cache line specified by the cache state information of each store transaction shares the same physical addressable location as the cache line being modified.

20. The computer program product of claim 19, wherein the cache state information comprises congruence class information.

21. The computer program product of claim 19, wherein the cache state information comprises aliased location information.

22. The computer program product of claim 19, wherein in case of an invalidate in the cache the computer code for updating the cache state information of the at least one store transaction comprises computer code for indicating that the cache line specified by the cache state information of the at least one store transaction has been removed from the cache.

23. The computer program product of claim 18, wherein in case of an invalidate in the cache the computer code for checking the store transactions comprises computer code for testing whether the cache line specified by the cache state information of each store transaction is the cache line being validated.

24. The computer program product of claim 23, wherein the computer code for updating the cache state information comprises computer code for updating aliased location information.

25. The computer program product of claim 23, wherein the computer code for updating the cache state information comprises computer code for updating congruence class information.

26. The computer program product of claim 25, wherein the computer code for updating the cache state information comprises computer code for updating hit/miss information.

* * * * *